UNITED STATES PATENT OFFICE.

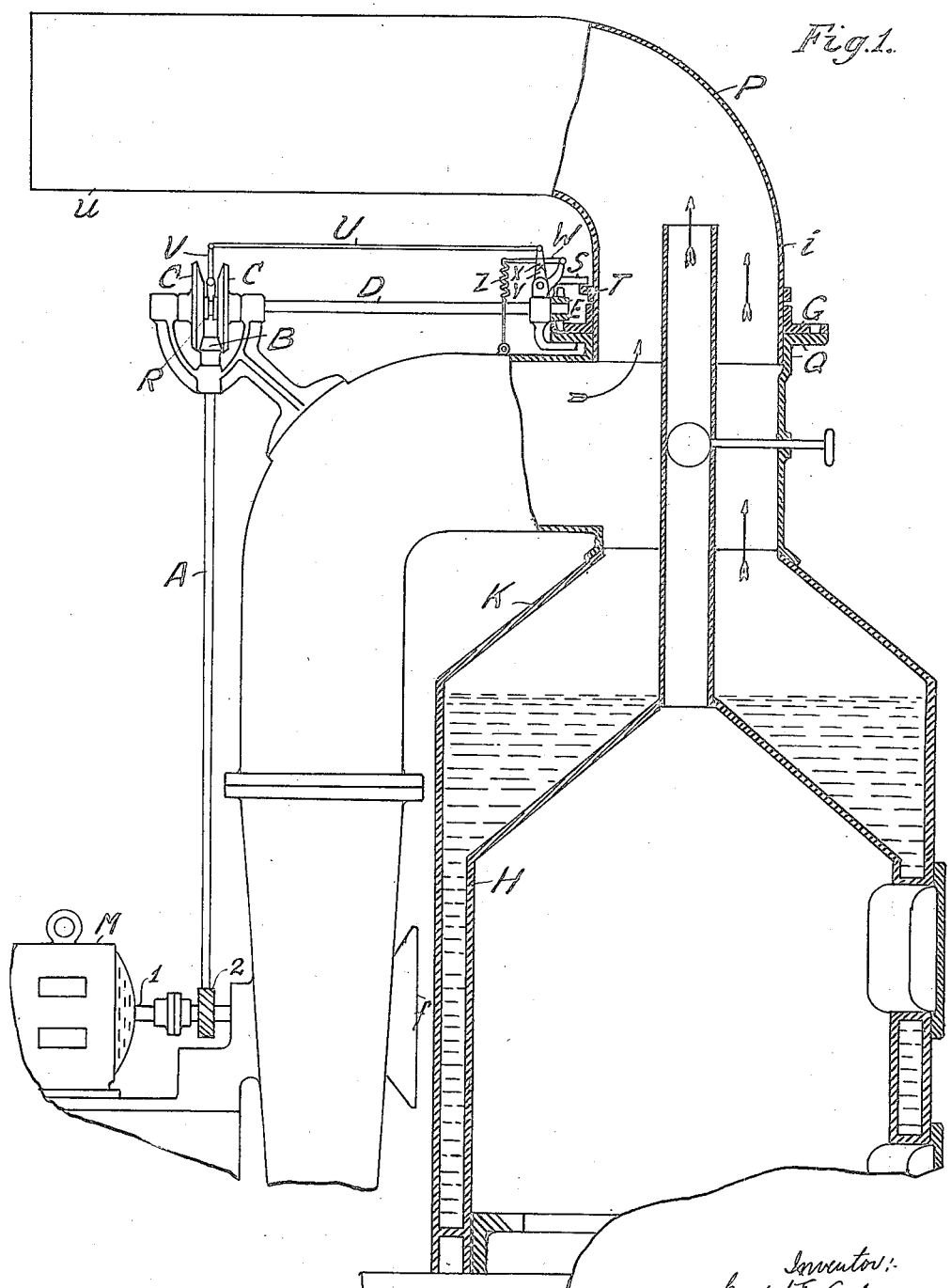

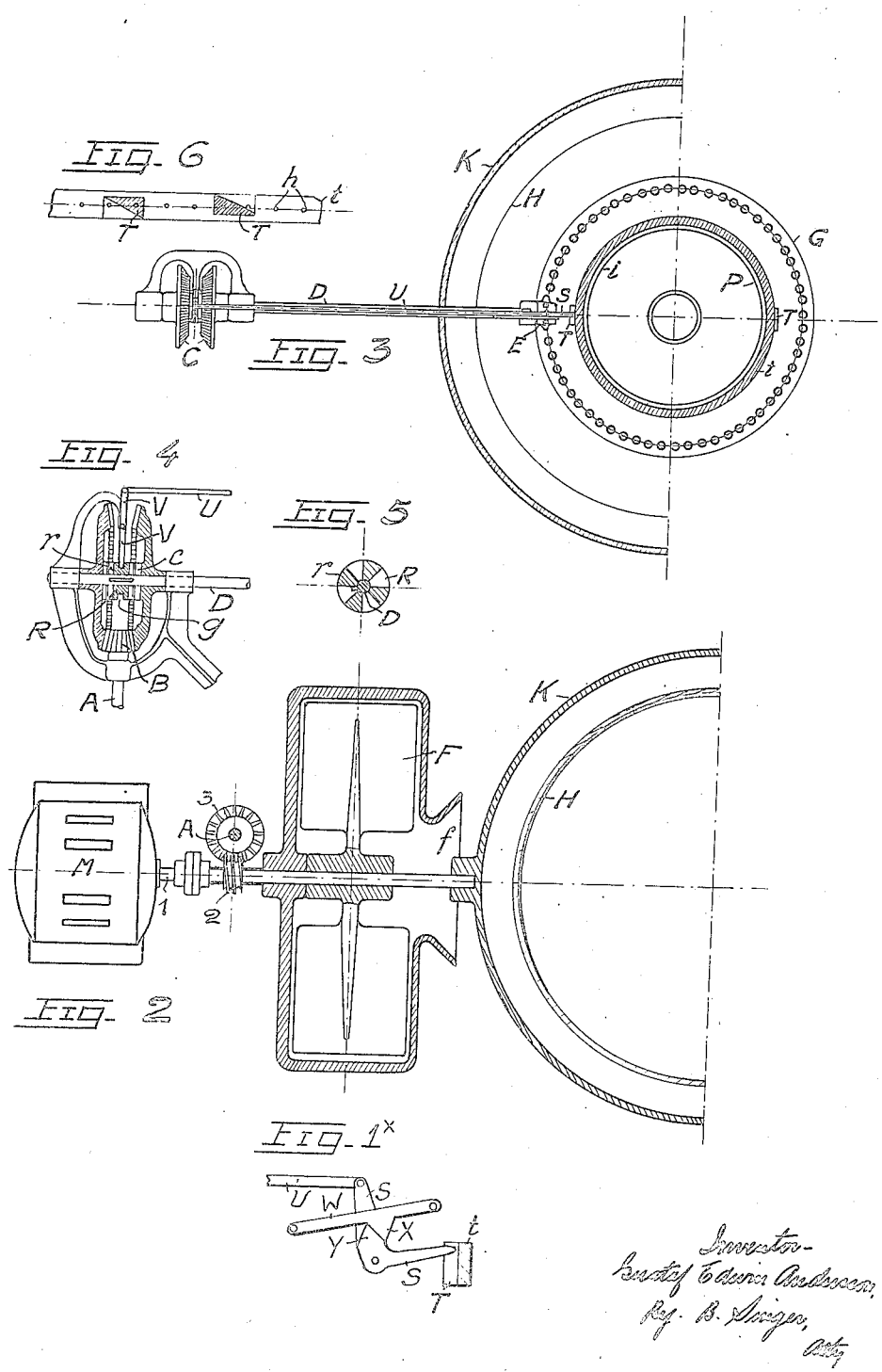

GUSTAF EDWIN ANDERSSON, OF ERIKSHÄLL, NEAR UPSALA, SWEDEN.

MEANS TO PROTECT VEGETATION FROM FROST.

1,372,793. Specification of Letters Patent. Patented Mar. 29, 1921.

Application filed May 14, 1919. Serial No. 297,153.

*To all whom it may concern:*

Be it known that I, GUSTAF EDWIN ANDERSSON, a subject of the King of Sweden, residing at Erikshäll, near Upsala, in Sweden, have invented Improved Means to Protect Vegetation from Frost, of which the following is a specification.

My invention relates to improved means to protect the crop from being destroyed by night frost or similar climatic changes by removing the destructive air or mixing it with air of other temperature, or with a mixture of air and steam from a suitable generator.

One of the features of my invention includes the outlet from a fan or the like which supplies compressed air to a distributing pipe which is rotatable or swingable around a vertical axis so as to distribute the air (which may be tempered in any suitable way) over the garden, field, valley, etc., which should be protected.

If the air is to be mixed with steam, for instance in order to heat the air, the heating source may be mounted within the steam boiler and the steam may be used to drive the fan, for instance by means of a steam turbine, before it is allowed to escape into the distributing pipe.

The engine which drives the fan may be used for driving the distributing pipe also by means of any suitable mechanism. A suitable form of such mechanism is one of the objects of the invention.

If the heating source consists of a furnace, the flue from said furnace may open into the distributing pipe so that the hot waste gases from the furnace are mixed with the air, in order to raise the temperature of the air. The inlet to the fan may be so arranged with regard to the heating source that the air is tempered to a certain degree already before its entrance into the fan, if preferred.

In the drawing which shows an example with the fan combined with a boiler in which a furnace is mounted,—

Figure 1 is a side view, partly sectional, some parts broken away for lack of space.

Fig. 1× is a detail view of the means for automatically changing the direction of the movement.

Fig. 2 is a horizontal section along the motor shaft (some parts omitted).

Fig. 3 is a horizontal section, partly along the link U (Fig. 1), partly along the upper surface of the water in boiler K (Fig. 1), some parts being omitted.

Fig. 4 is a vertical section along shafts A and D (Fig. 1) on a larger scale.

Fig. 5 is an end view of the coupling box R on a still larger scale.

Fig. 6 is a side view of a portion of the ring $t$ (Figs. 1 and 3) with its projections T, intended to show the opposite inclined faces of said projections.

The fan F which in the example, is shown driven by an electromotor M propels a strong current of air through the outlet. Said outlet consists of a pipe P with vertical lower portion $i$ and laterally directed upper portion $u$ which is adapted to rotate or oscillate around the vertical axis of said vertical portion. Any suitable means may be used for effecting such rotation or oscillation. The preferred means shown on the drawing is constructed as follows:—

The shaft 1 of motor M drives a vertical shaft A by means of a worm 2 and worm wheel 3. On the upper end of shaft A of the wheel 3 is fixed a gear B which meshes with two gears C mounted loose on a common horizontal shaft D, the other end of which has a fixed gear E in mesh with an annular gear G fixed coaxially on the vertical portion of the distributing pipe P, which is rotatable in and supported by a bearing Q. Between the loose gears C a coupling box R with teeth $r$ on both sides is mounted on the shaft D, for instance by key and slot (Figs. 4—5) and is adapted to slide along, but not rotate on the shaft so as to engage coupling members $c$ on any of said gears C whereby the box is rotated by the gears C and in its turn rotates the shaft D in one direction or the other. The box R is shifted from one gear C to the other automatically by means of an angle lever S the one end of which is adapted to engage inclined faces on two projections T fastened on the pipe P, one of said projections being disposed to turn the lever in one direction, the other in the other direction. The other end of lever S is connected by a link U to a lever V which engages a circular groove $g$ on the box R. A spring actuated lever W has an edge-shaped projection X with two inclined faces adapted to engage a similar projection Y on the lever S so as to keep the lever in both working positions. When the edges of said projections meet each other, the box R has the intermediate position shown on the drawing, in which position it is disengaged from both gears C. It will be seen that the spring Z tends to turn the lever W so as to throw the box R into engagement with one of the gears C, whereby the shaft D is rotated, and thus the pipe P is forced to rotate. Before the pipe has made a full turn, one of its projections T reaches the lever S and shifts the position of the same so that box R is disengaged from one gear C and forced to engage the other gear C, whereby the shaft D is turned the other way and the pipe P caused to stop and rotate in the other direction until the other projection T reaches the lever S and shifts against the position of the box R.

The projections or stops T may be detachable, and adapted to be fixed in different distances from each other so as to vary the size of the angle passed by the oscillating pipe P. For this purpose the projections T may be fixed by screws or the like on a ring or flange t which is secured on pipe P, the ring having a series of holes h for the screws.

If the apparatus is placed at about the center of the surface to be protected, the stops T should be taken away and the pipe P allowed to rotate continuously in a single direction so as to spread the tempered air in all horizontal directions.

The example shows a heat source H in the form of a stove mounted within a boiler K. The products of combustion from the stove and the steam from the boiler are led into the pipe P so as to mingle with and heat the air coming from the fan F. The inlet f to the fan faces the boiler K, so as to cause the air to sweep around the hot boiler and thus be somewhat tempered before it enters the fan.

In some instances, the heating apparatus is dispensed with, and air of ordinary temperature is used as it is often sufficient to stir the air by blowing strong currents of air through it so as to mingle the air of the lowest most cold layers with air from the superposed less cold layers.

Having thus described my invention, I claim:

1. Means to protect vegetation from frost, comprising a laterally directed pipe, a fan to drive air into said pipe, a heating source to raise the temperature of said air, a boiler heated by said source and having a steam pipe which discharges into the first named pipe, and means for swinging the first named pipe around a vertical axis so as to spread the air.

2. Means to protect vegetation from frost, comprising a laterally directed pipe, a fan supplying air and a boiler supplying steam to said pipe and a stove mounted in said boiler and discharging the products of combustion into said pipe, and means for swinging or oscillating the pipe around a vertical axis so as to spread the air.

3. Means to protect vegetation from frost, comprising a laterally directed pipe, means for feeding air into said pipe, means for heating the air, and means for swinging the pipe around a vertical axis, and automatically reversing its movement, said means consisting of a vertical shaft, with a gear meshing two loose gears on a horizontal shaft which has a gear in mesh with an annular gear coaxially fixed on a vertical portion of said pipe, a coupling box on the horizontal shaft between said loose gears, and means for coupling said box to either of the two loose gears.

GUSTAF EDWIN ANDERSSON.

Witnesses:
NILS LUNDBERG,
J. WADOLIN.